April 4, 1944.  G. VIGNERI  2,345,954
SPRING MOTOR
Filed Aug. 4, 1942  4 Sheets-Sheet 1

Giuseppe Vigneri INVENTOR.

BY
Victor J. Evans & Co.
ATTORNEYS

April 4, 1944. G. VIGNERI 2,345,954
SPRING MOTOR
Filed Aug. 4, 1942 4 Sheets-Sheet 2

Giuseppe Vigneri INVENTOR.

BY
Victor J. Evans & Co.
ATTORNEYS

April 4, 1944.　　　G. VIGNERI　　　2,345,954
SPRING MOTOR
Filed Aug. 4, 1942　　　4 Sheets-Sheet 3

Giuseppe Vigneri INVENTOR.

BY
Victor J. Evans & Co.
ATTORNEYS

April 4, 1944.  G. VIGNERI  2,345,954
SPRING MOTOR
Filed Aug. 4, 1942  4 Sheets-Sheet 4
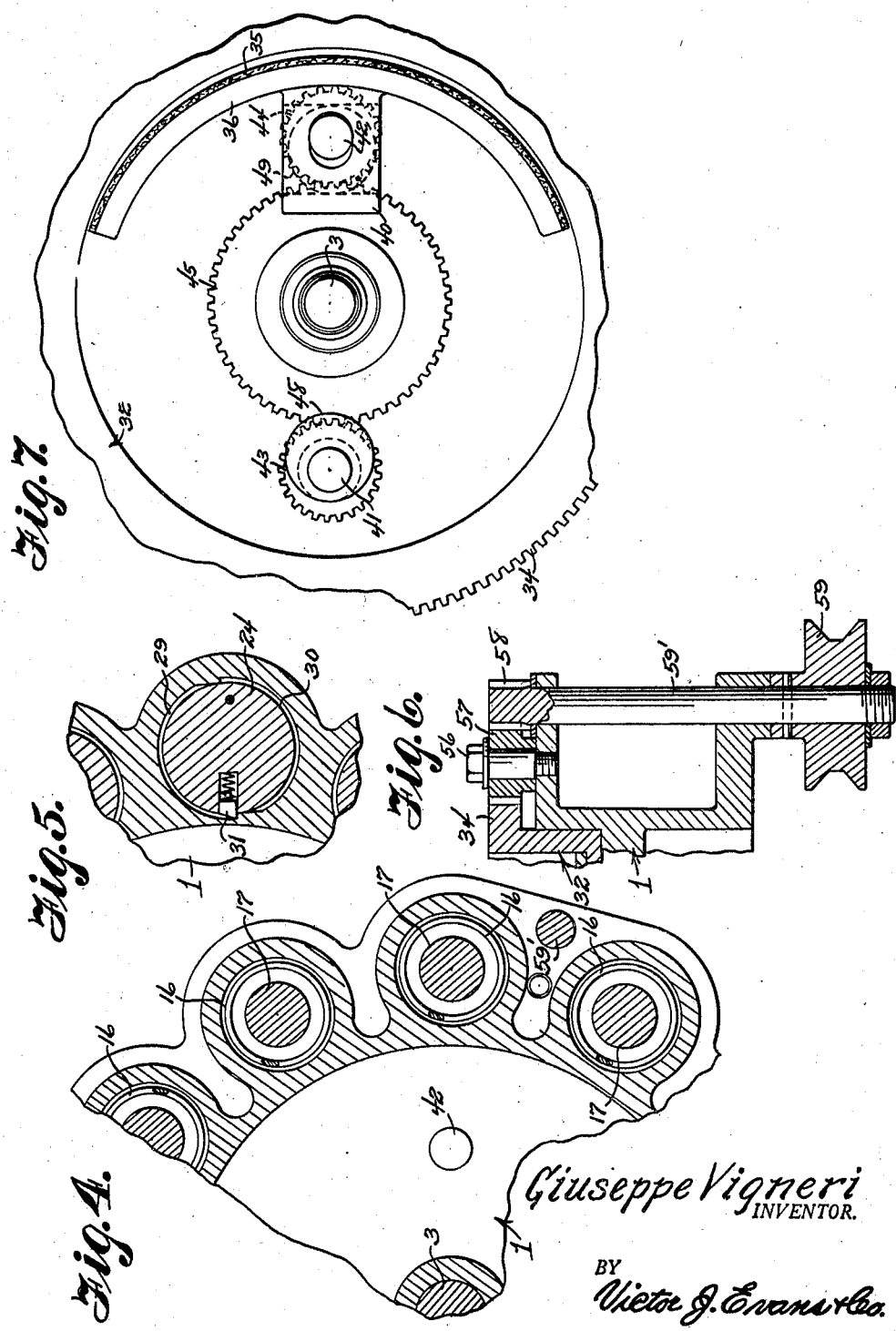
Giuseppe Vigneri
INVENTOR.
BY
Victor J. Evans & Co.
ATTORNEYS Patented Apr. 4, 1944

2,345,954

UNITED STATES PATENT OFFICE 2,345,954

SPRING MOTOR

Giuseppe Vigneri, Newark, N. J.

Application August 4, 1942, Serial No. 453,579

7 Claims. (Cl. 185—11)

The invention relates to improvements in spring motors.

The object of the invention is to provide a multiple spring motor in which the individual springs are partially rewound, one at a time and in succession, upon every revolution of the driven shaft by the combined power of the remaining springs, whereby the motor will run for a greater length of time.

Another object of the invention is to provide a simple and effective spring motor of this type which can be cheaply manufactured, readily assembled and the individual springs easily replaced.

In the accompanying drawings,

Figure 4 is a vertical sectional view, taken on the line 4—4 of Figure 3, looking in the direction of the arrow.

Figure 5 is a vertical sectional view, taken on the line 5—5 of Figure 3, looking in the direction of the arrow.

Figure 6 is a sectional view, taken on the line 6—6 of Figure 2, looking in the direction of the arrow.

Figure 7 is a fragmentary side elevation of that side of the motor shown at Figure 2 with parts removed.

Figure 1:
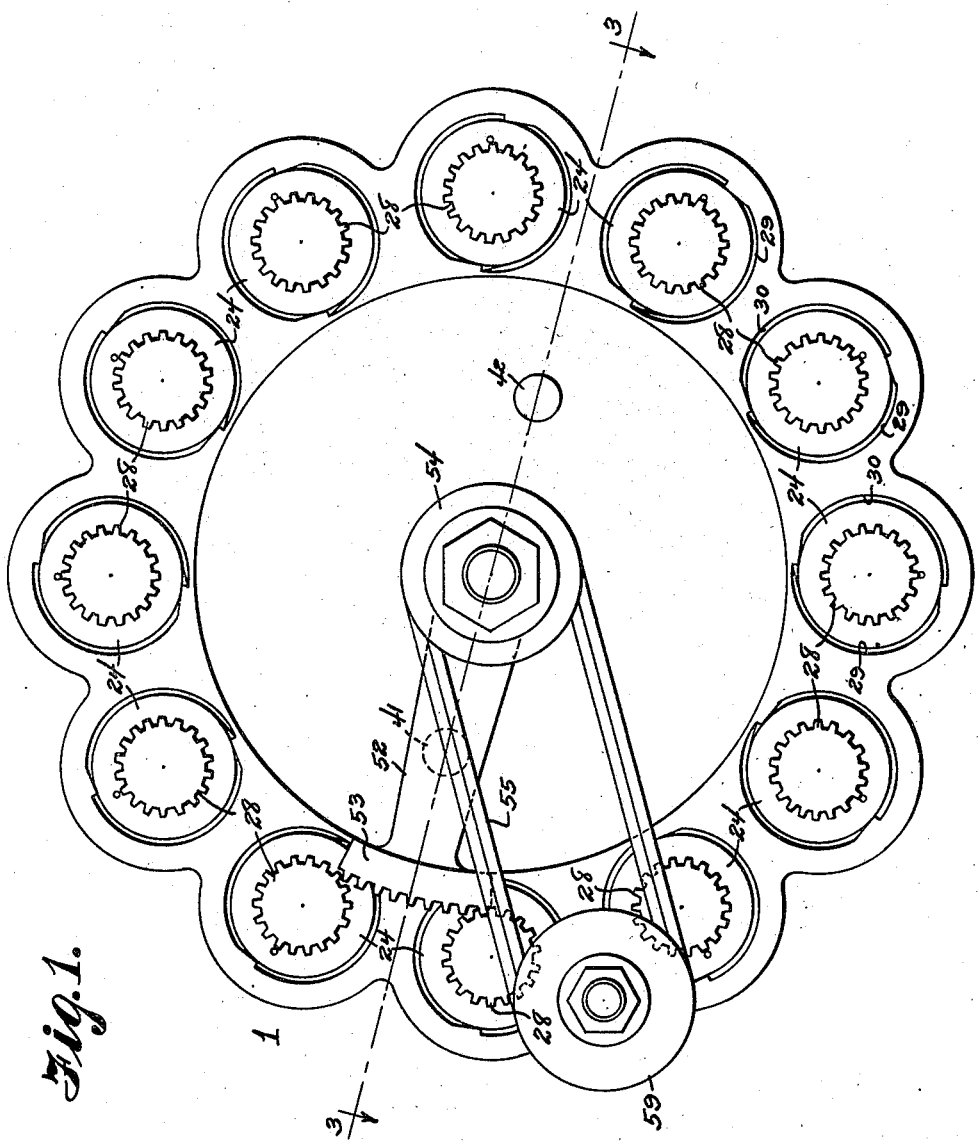
Figure 1 is a side elevation of my improved spring motor.
Figure 2:
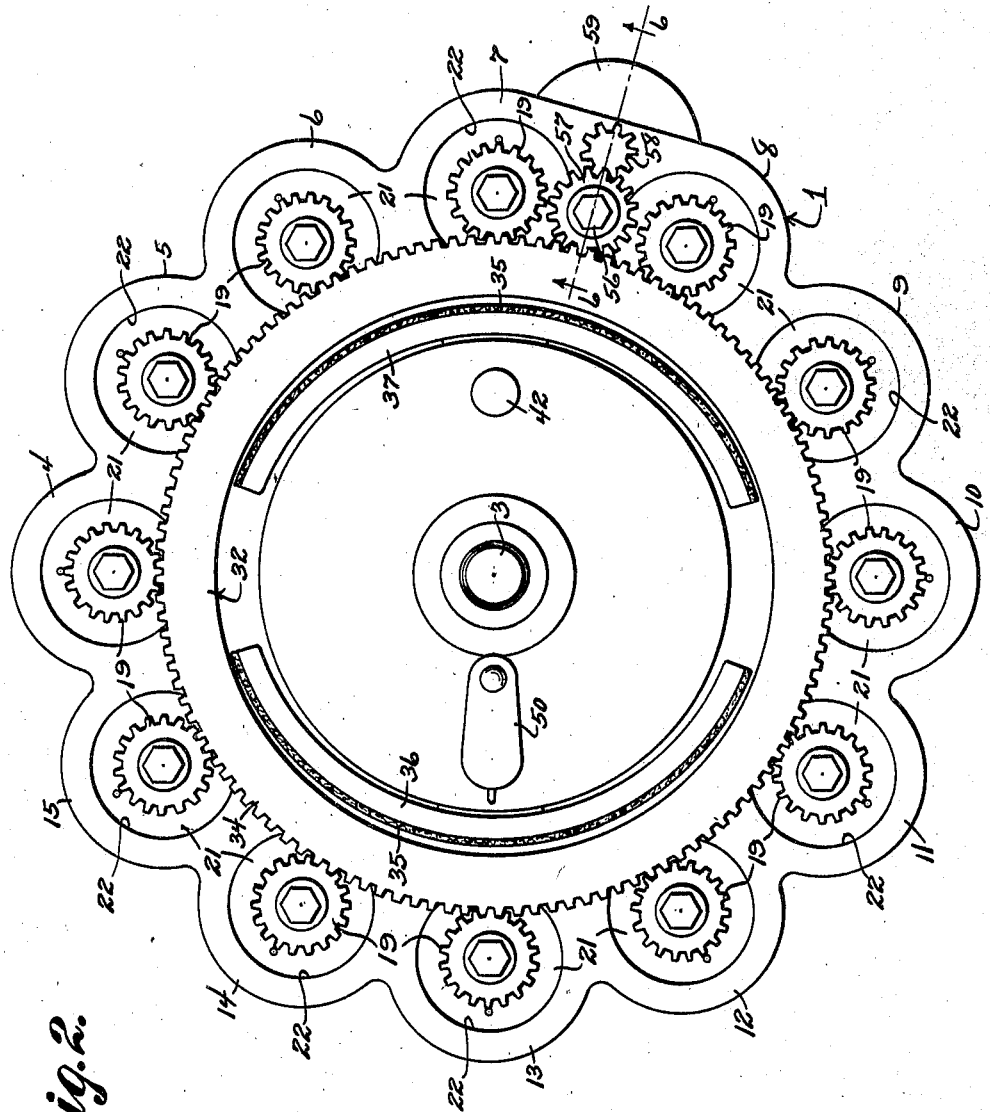
Figure 2 is a side elevation, looking from the opposite side from that of Figure 1.

Referring now to the drawings, 1 represents a circular motor frame which may be supported in any desired manner against rotation, and has at its center a shaft bearing 2 extending therethrough and in which rotates the shaft 3. The outer periphery of the motor frame 1 is provided with twelve cylindrical housings 4, 5, 6, 7, 8, 9, 10, 11, 12, 13, 14 and 15, preferably connected together, as shown in Figures 1 and 2 of the drawings. Arranged in each housing is a coil spring 16 surrounding the drum 17. One end of said drum is reduced, as indicated at 18, Figure 3, and has secured thereon a gear 19. The inner end of the gear 19 is provided with a sleeve 20, having, at its inner end, the annular flange 21, which is rotatably mounted in the recess 22 in the ends of the spring housings. The end of the coil spring passes through an opening 23 in the flange 21; and, therefore, rotates the same, as clearly shown in Figure 3 of the drawings. The opposite end of the drum 17 is provided with an annular flange 24, fitting in a recess 25, carried by the housing, and the opposite end of the spring 16 enters an opening 26, whereby the same is held against rotation. The flange 24 is provided with an extension 27, carrying a gear 28, the purpose of which will be later described. The inner face of the recess 25 is provided with cam slots 29 and 30, in which are spring held the dogs 31, whereby the drum is held against rotation in one direction by the tension of the spring 16, but may be rotated by hand for winding the spring, as clearly shown in Figure 5 of the drawings.

The circular motor frame 1 has mounted therein a drum 32, which is free to rotate and provided with a laterally extending inner end 33. The outer end of the drum is provided with a ring gear 34 which meshes with the gears 19, carried by the drums within the twelve spring housings. The inner periphery of the drum 32 forms a brake drum adapted to be engaged by the brake lining 35, carried by the brake shoes 36 and 37. These brake shoes are mounted within the L-shaped plate 38, carried by the circular motor frame, as clearly shown in Figure 3 of the drawings. The brake shoes 36 and 37 are provided with inwardly extending portions 39 and 40, having openings therethrough, in which are mounted the shafts 41 and 42. The shafts are provided with gears 43 and 44 which mesh with the gear 45, rotatably mounted in the L-shaped plate 38, and whereby the two shafts 41 and 42 are simultaneously rotated. The portions 39 and 40 of the brake shoes 36 and 37 are provided with recesses 46 and 47, in which rotate the cams 48 and 49, carried by the shafts 41 and 42. The end of the shaft 41 is adapted to receive a crank 50, whereby the same is rotated. By this arrangement, it will be seen that the shaft 41 is rotated which in turn rotates the gear 45, meshing with the gear 44 on the shaft 42, so that the shafts 41 and 42 are rotated together. The cams carried by the shafts force the brake shoes outwardly for engagement with the ring gear to prevent the rotation thereof.

Figure 3:
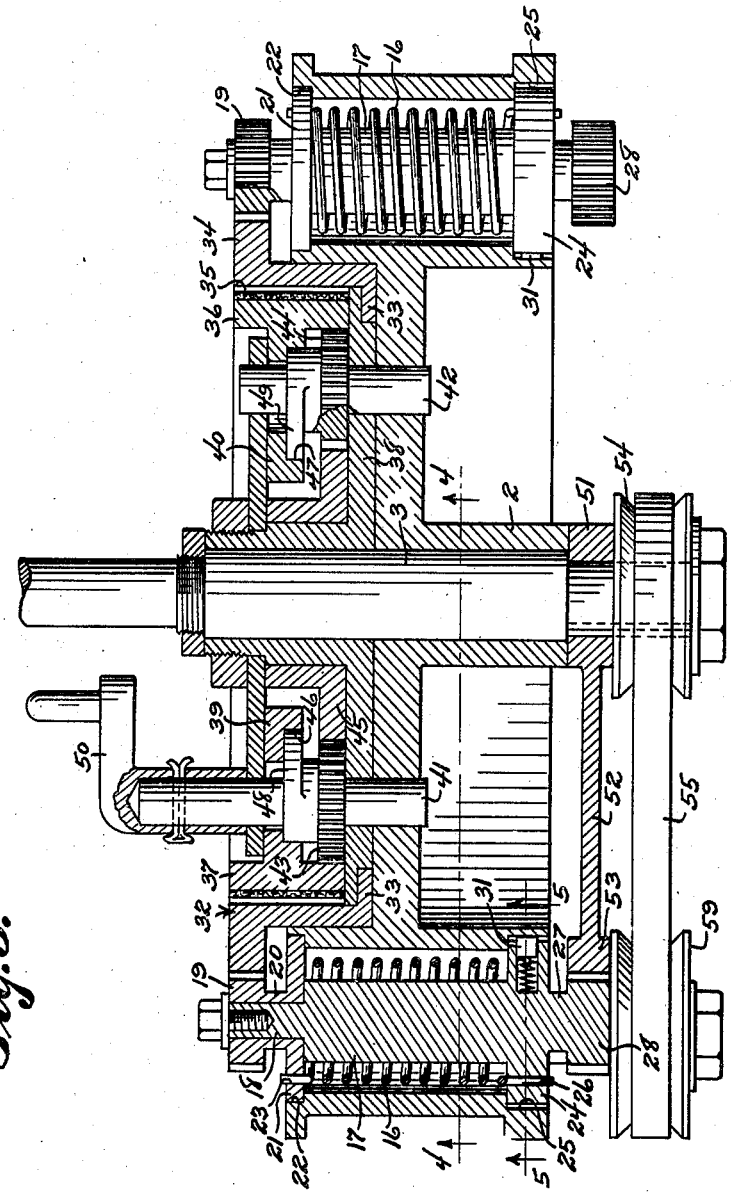
Figure 3 is a transverse sectional view, taken on the line 3—3 of Figure 1.

The shaft 3 has mounted thereon a sleeve 51, carrying an arm 52, provided at its outer end with a segment 53 adapted to engage the gears 28 carried by the drums of the springs, as clearly shown in Figures 1 and 3 of the drawings. The shaft 3, beyond the sleeve 51, is provided with a pulley 54 around which a belt 55 passes. The motor frame 1, as shown in Figure 2 of the drawings, is provided with a stub shaft 56, carrying a gear 57 meshing with the ring gear 34. A gear 58, mounted on the motor frame, meshes with the gear 57. The shaft of the gear 58 is provided with a pulley 59, around which the belt 55 passes.

In operation the springs within the twelve housings are all tightly wound by hand, the gears 28 providing means for winding the same. It will be understood that, before the springs are wound, the brake crank is rotated so that the brake shoes 36 and 37 engage the inner periphery of the drum of the ring gear 34 and locks the same against rotation. Upon the release of the brake shoes the spring drums are caused to rotate by the exertion of the springs, which in turn rotates the ring gear 34. The rotation of the ring gear, by its engagement with the gear 57, rotates the same which in turn rotates the gear 58. The shaft of the gear 58 rotates the pulley 59 and by means of the belt 55 and pulley 54 rotates the shaft 3, from which the necessary power is derived. The rotation of the shaft 3 causes the arm 52 to travel around in a clockwise direction and the segmental rack 53 engages the gears 28 carried by the spring drums. It will be seen that the segmental rack 53 engages only one gear 28 at a time and causes a half winding turn of the spring drum. While winding one of the spring drums, the springs of the remaining eleven are exerting the power of their springs on the ring gear to cause a rotation thereof, which in turn drives the belt 55, as heretofore described, causing the rotation of the drive shaft 3.

By operating the crank 50, it will be noted that the speed of the ring gear 34 can be controlled and, therefore, the speed of the drive shaft 3.

What I claim is:

1. A spring motor, comprising a frame, a shaft rotatably mounted in the frame, a ring gear rotatably mounted in the frame around the shaft, brake shoes for locking the ring gear to the frame, a series of housings arranged around the ring gear, spring drums within the housings and provided with gears meshing with the ring gear, rewinding gears carried by the opposite ends of the spring drums, means operated by the ring gear for rotating the shaft, and an arm carried by the shaft and having a segmental rack adapted to engage the gears carried by the ends of the spring drums for rewinding the same in succession one at a time.

2. A spring motor, comprising a frame, a shaft rotatably mounted in the frame, a ring gear rotatably mounted in the frame around the shaft, a series of housings carried by the frame beyond the ring gear, spring drums within the housings and provided with gears meshing with the ring gear, rewinding gears carried by the opposite ends of the spring drums, means operated by the ring gear for rotating the shaft, an arm carried by the shaft and having a segmental rack at its outer end adapted to engage the gears carried by the ends of the spring drums for rewinding the same in succession one at a time, brake shoes carried by the frame on opposite sides of the shaft and engaging the ring gear, and means for simultaneously operating said brake shoes.

3. A spring motor, comprising a frame, a shaft rotatably mounted in the frame, a ring gear rotatably mounted in the frame around the shaft, a series of housings arranged around the ring gear, spring drums within the housings and provided with gears meshing with the ring gear, rewinding gears carried by the opposite ends of the spring drums, a pulley driven by the ring gear, a pulley carried by the shaft, a belt passing around said pulleys, and an arm carried by the shaft and having a segmental rack adapted to engage the gears carried by the ends of the spring drums for rewinding the same in succession one at a time.

4. A spring motor, comprising a frame, a shaft rotatably mounted in the frame, a ring gear rotatably mounted in the frame around the shaft, brake shoes carried by the frame and engaging the ring gear for locking the same to the frame, a series of housings arranged around the gears, spring drums within the housings and provided with gears meshing with the ring gear, rewinding gears carried by the opposite ends of the spring drums, a gear carried by the frame and meshing with the ring gear, a pulley rotated by the last mentioned gear, a pulley carried by the shaft, a belt passing around said pulleys, an arm rigidly carried by the shaft, and a segment carried by the outer end of said arm and engaging the rewinding gears carried by the spring drums for rewinding the same in succession one at a time.

5. A spring motor, comprising a frame, a shaft rotatably mounted in the frame, a ring gear rotatably mounted in the frame around the shaft, brake shoes carried by the frame and engaging the inner periphery of the ring gear, means for moving the brake shoes to lock the ring gear to the frame, a series of housings arranged around the ring gear, spring drums within the housings and provided with gears meshing with the ring gear, a gear meshing with the ring gear, a pinion meshing with the last mentioned gear, a pulley carried by the pinion, a pulley carried by the shaft, a belt passing around said pulleys, an arm rigidly carried by the shaft, a segmental rack carried by the outer end of the arm and adapted to engage one of the rewinding gears at a time, the said gears carried by the ends of the spring drums.

6. A spring motor, comprising a frame, a shaft rotatably mounted in the frame, a ring gear rotatably mounted in the frame around the shaft, radially movable brake shoes carried by the frame on opposite sides of the shaft and engaging the inner periphery of the ring gear, cams for simultaneously moving the brake shoes into engagement with the ring gear to lock the same to the frame, a series of housings arranged around the ring gear, spring drums within the housings and provided with gears meshing with the ring gear, rewinding gears carried by the opposite ends of the spring drums, a gear meshing with the ring gear, a pulley driven by the last mentioned gear, a pulley carried by the shaft, a belt passing around said pulleys for driving the shaft, an arm carried by the shaft, a segmental rack carried by the outer end of the arm and adapted to engage one of the rewinding gears at a time.

7. In a spring motor having a frame, a rotary power shaft journaled on the frame, a ring gear rotatably mounted on the frame, a series of spring driven gears in mesh with the said ring gear, a countershaft on the frame having a pinion fixed thereon meshing with the ring gear, a belt connection for driving the said power shaft from the countershaft, and means on the power shaft for successively rewinding the spring driven gears during rotation of the power shaft.

GIUSEPPE VIGNERI.